(12) United States Patent
Carlsson et al.

(10) Patent No.: US 9,200,150 B2
(45) Date of Patent: Dec. 1, 2015

(54) SILICON CONTAINING COMPOUND AS PROCESSING AID FOR POLYOLEFIN COMPOSITIONS

(75) Inventors: Roger Carlsson, Save (SE); Bernt-Ake Sultan, Stenungsund (SE); Ola Fagrell, Stenungsund (SE)

(73) Assignee: Borealis Technology OY, Porvoo (FI)

( * ) Notice: Subject to any disclaimer, the term of this patent is extended or adjusted under 35 U.S.C. 154(b) by 464 days.

(21) Appl. No.: 12/301,351

(22) PCT Filed: May 23, 2007

(86) PCT No.: PCT/EP2007/004590
§ 371 (c)(1),
(2), (4) Date: Jan. 29, 2009

(87) PCT Pub. No.: WO2007/137756
PCT Pub. Date: Dec. 6, 2007

(65) Prior Publication Data
US 2009/0203821 A1      Aug. 13, 2009

(30) Foreign Application Priority Data
May 30, 2006   (EP) ..................................... 06011134

(51) Int. Cl.
| | | |
|---|---|---|
| C08K 5/5419 | (2006.01) | |
| C08L 23/02 | (2006.01) | |
| C08L 23/04 | (2006.01) | |
| C08L 23/08 | (2006.01) | |
| C08L 51/06 | (2006.01) | |

(52) U.S. Cl.
CPC .............. *C08L 23/02* (2013.01); *C08K 5/5419* (2013.01); *C08L 23/04* (2013.01); *C08L 23/0869* (2013.01); *C08L 51/06* (2013.01); *C08L 2312/08* (2013.01)

(58) Field of Classification Search
CPC .................................. C08K 5/42; C08L 43/04
USPC ........................... 524/266, 265, 157, 158, 261
See application file for complete search history.

(56) References Cited

U.S. PATENT DOCUMENTS

| | | | |
|---|---|---|---|
| 1,589,757 A * | 6/1926 | Hardman ..................... | 525/352 |
| 3,100,753 A | 8/1963 | Spencer | |
| 3,646,155 A | 2/1972 | Scott | |
| 4,117,195 A | 9/1978 | Swarbrick et al. | |
| 4,297,310 A | 10/1981 | Akutsu et al. | |
| 4,351,876 A | 9/1982 | Doi et al. | |
| 4,397,981 A | 8/1983 | Doi et al. | |
| 4,413,066 A * | 11/1983 | Isaka et al. ..................... | 521/149 |
| 4,446,283 A | 5/1984 | Doi et al. | |
| 4,456,704 A | 6/1984 | Fukumura et al. | |
| 4,535,113 A | 8/1985 | Foster et al. | |
| 4,925,890 A | 5/1990 | Leung et al. | |
| 5,350,812 A | 9/1994 | Sultan et al. | |
| 5,859,076 A * | 1/1999 | Kozma et al. .................... | 521/79 |
| 6,005,055 A * | 12/1999 | Dammert et al. .......... | 525/326.5 |
| 6,342,552 B1 | 1/2002 | Hergenrother et al. | |
| 7,125,922 B2 * | 10/2006 | Barfurth et al. ............... | 524/265 |
| 2003/0078340 A1 * | 4/2003 | Fatnes et al. .................... | 525/55 |

FOREIGN PATENT DOCUMENTS

| | | |
|---|---|---|
| EP | 1 309 631 | 4/2005 |
| EP | 1 309 632 | 4/2005 |
| EP | 1 254 923 | 8/2006 |
| GB | 2 067 132 | 12/1979 |
| WO | WO 95/17463 | 6/1995 |
| WO | WO 2005/003199 | 1/2005 |

OTHER PUBLICATIONS

International Search Report dated Sep. 26, 2007 for International application No. PCT/EP2007/004590.
Written Opinion of the International Searching Authority dated Sep. 26, 2007 for International application No. PCT/EP2007/004590.
Response to Written Opinion of the International Searching Authority dated Feb. 25, 2008 for International application No. PCT/EP2007/004590.
International Preliminary Report on Patentability dated Sep. 9, 2008 for International application No. PCT/EP2007/004590.

* cited by examiner

*Primary Examiner* — Wenwen Cai
(74) *Attorney, Agent, or Firm* — Fay Sharpe LLP

(57) ABSTRACT

The present invention relates to the use of a silicon containing compound for reducing the retention time of a polyolefin composition comprising a crosslinkable polyolefin with hydrolysable silane groups. A master batch is compounded with the polyolefin composition to form a compounding composition. The master batch comprises a matrix polymer, a Bronsted acid that is a silanol condensation catalyst and is present in the amount of 0.7 to 3.5 wt %, and a silicon containing compound with a structure according to the formula (I): $(R^1)_x[Si(R^2)_y(R^3)_z]_m$ wherein $R^1$ is $C_{6-22}$ alkyl, $R^2$ is $C_{1-10}$ alkoxy, $R^3$ is $-R^4SiR^1R^2$, $R^4$ is $-(CH_2)_rY_s(CH_2)_t-$ where Y is a difunctional heteroatomic group, $x+y+z=4$, and $m=1$. The silicon containing compound is 2 to 10 wt % of the master batch, and 0.01 to 1.5 wt % of the compounding composition.

11 Claims, No Drawings

SILICON CONTAINING COMPOUND AS PROCESSING AID FOR POLYOLEFIN COMPOSITIONS

BACKGROUND

The present invention relates to the use of a silicon containing compound as processing aid in the compounding of polyolefin compositions and to a process for compounding a polyolefin composition comprising a silicon containing compound as processing aid.

Polyolefin compositions often comprise several polymeric components, as for example polyolefin resins with different properties, such as different molecular weights, or different content of comonomer. Furthermore, organic and/or inorganic additives such as stabilizers are usually present in a polyolefin composition. The nature and amount of these polyolefin resins and these additives is dependent on the particular use a polyolefin composition is designed for.

In order to obtain a homogeneous end-product, it is important that a very good mixing of the components of the polyolefin composition is obtained, including a very good dispersion of the additives in the polymer matrix. Furthermore, also a high throughput in the processing step, e.g. a high output of an extruder in which the composition is extruded, is desired.

When compounding the polyolefin composition e.g. by extrusion, it is known that mixing, and hence dispersion of the additives, can be improved by higher energy input into the extruder. Of course, also a higher output of the extruder requires higher energy input into the extruder. However, due to an increase of temperature of the polyolefin composition created by friction the amount of energy input and hence the output of the extruder is limited, because usually the polyolefin composition starts degrading at a temperature of about 200° C. It would thus be desirable to have a polyolefin composition allowing for higher energy input into an extruder and hence higher output of the extruder, at lower temperatures thus avoiding degradation of the polyolefin.

Furthermore, in order to avoid degradation of the polyolefin as far as possible and to maximise extruder output, it is also desirable that the composition remains in the extruder as short as possible, i.e. it is desirably to decrease the retention time in the extruder.

Finally, for many applications, such as semiconductive layers in medium or high voltage cables, a high surface quality, including surface smoothness, of the extruded polyolefin composition is required.

It is hence an object of the present invention to provide a processing aid for use in polyolefin compositions, thereby improving the processing properties of the polyolefin compositions, in particular resulting in lower extrusion temperature and higher throughput upon extrusion, decreased retention time in the extruder, and improved surface quality after extrusion.

BRIEF SUMMARY

It has now surprisingly been found that the above objects can be achieved by using a silicon containing compound as processing aid in the compounding for polyolefin compositions.

The present invention therefore provides the use of a silicon containing compound as processing aid in the compounding of a polyolefin composition, wherein the silicon containing compound has a structure according to the formula $$(R^1)_x[Si(R^2)_y(R^3)_z]_m \quad (I)$$

wherein $R^1$, which may be the same or different if more than one such group is present, is a monofunctional, or, if m=2, is a bifunctional, hydrocarbyl residue comprising from 1 to 100 carbon atoms;

$R^2$, which may be the same or different if more than one such group is present, is a hydrocarbyloxy residue comprising from 1 to 100 carbon atoms;

$R^3$, is $-R^4SiR^1_pR^2_q$, wherein
p is 0 to 3, preferably 0 to 2,
q is 0 to 3, preferably 1 to 3,
with the proviso that p+q is 3, and $R^4$ is $-(CH_2)_rY_s(CH_2)_t-$ where r and t independently are 1 to 3, s is 0 or 1 and Y is a difunctional heteroatomic group selected from $-O-$, $-S-$, $-SO-$, $-SO_2-$, $-NH-$, $-NR^1-$ or $-PR^1-$, where $R^1$ and $R^2$ are as previously defined; and x is 0 to 3, y is 1 to 4, z is 0 or 1, with the proviso that x+y+z=4;

and m=1 or 2.

DETAILED DESCRIPTION

The use according to the invention results in an improved processing behaviour of the polyolefin composition because it enables e.g. extrusion of a polyolefin composition at significantly decreased temperature and, at the same time, with very good dispersion and high output. Thus, much longer production campaigns are possible.

Still further, the composition after compounding has a very good surface quality, e.g. surface smoothness and low gels content. In particular, the high surface quality is obtained also immediately upon compounding of new material of the composition, after the compounding unit has been stopped for a certain time, e.g. for tool change.

In particular, the processing aid of the invention decreases the retention of the polyolefin composition in the compounding unit. Compounding includes all forms of melt-mixing polyolefin compositions, including the production of pellets or final articles.

Compounding of the polyolefin composition preferably is done by extrusion.

Preferably, the silicon containing compound has a high compatibility with the polymer composition which means that even after treatment of the composition at elevated temperature for several hours the major part of the silicon containing compound does not volatise from the composition. The compatibility of the silicon containing compound can be adjusted by appropriate selection of, especially, group $R^1$, which should be chosen sufficiently large and non-polar.

Further on, preferably, in formula (I) for the silicon containing compound:

$R^1$, which may be the same or different if more than one such group is present, is an alkyl, arylalkyl, alkylaryl or aryl group containing 1 to 40 carbon atoms, with the proviso that if more than one $R^1$ group is present the total number of carbon atoms of the $R^1$ groups is at most 60, and more preferably:

$R^1$, which may be the same or different if more than one such group is present, is a linear or branched $C_6$- to $C_{22}$-alkyl, still more preferably is a $C_8$- to $C_{20}$-alkyl group.

Furthermore, preferably in formula (I) for the silicon containing compound:

$R^2$, which may be the same or different if more than one such group is present, is an alkoxy, aryloxy, alkylaryloxy, or arylalkyloxy group containing 1 to 15 carbon atoms, with the proviso that if more than one $R^2$ group is present the total number of carbon atoms in the alkyl moieties of the $R^2$ groups is at most 40, more preferably:

$R^2$, which may be the same or different if more than one such group is present, is a linear or branched $C_1$- to $C_{10}$-alkoxy, still more preferably is a $C_1$- to $C_8$-alkoxy, still more preferably is a $C_1$- to $C_4$-alkoxy, and most preferably is a methoxy, ethoxy, propoxy, or 1-butoxy group.

The alkyl moieties of $R^1$ and $R^2$ may be linear or branched.

$R^1$ and $R^2$ may comprise heteroatom substituents, however, preferably $R^1$ and $R^2$ are free of any heteroatom substituents.

Preferably, in formula (I) x=1.

Furthermore, preferably in formula (I) y=3.

Still further, preferably in formula (I) z=0.

Finally, preferably in formula (I) m=1.

Preferred silicon containing compounds are also all those compounds which are combinations of any of the above-mentioned preferred embodiments for any of the parameters of formula (I).

In a particularly preferred embodiment, the silicon containing compound comprises, more preferably consists of, hexadecyl trimethoxy silane.

The amount of the silicon containing compound in the polyolefin composition preferably is from 0.001 to 5 wt % of the total composition, more preferably from 0.01 to 2.5 wt % of the total composition and most preferably from 0.5 to 1.5 wt % of the total composition.

It is known to cross-link polyolefins by means of additives as this improves the properties of the polyolefin such as mechanical strength and chemical heat resistance. Cross-linking may be performed by condensation of silanol groups contained in the polyolefin which can be obtained by hydrolysation of silane groups. A silane compound can be introduced as a cross-linkable group e.g. by grafting the silane compound onto a polyolefin, or by copolymerisation of olefin monomers and silane group containing monomers. Such techniques are known e.g. from U.S. Pat. Nos. 4,413,066, 4,297,310, 4,351,876, 4,397,981, 4,446,283 and 4,456,704.

For cross-linking of such polyolefins, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463. The contents of this document is enclosed herein by reference.

In a preferred embodiment of the invention, the polyolefin composition for which the above described silicon containing compound is used as a processing aid comprises a crosslinkable polyolefin with hydrolysable silane groups, and further comprises a silanol condensation catalyst.

It is found that such compositions in the extruder behave very similar to an thermoplastic material upon extrusion, i.e. there is virtually no drop in melt flow rate upon extrusion, and the retention time in the extruder is significantly decreased, when the silicon containing compound as described above is used as a processing aid. This again proves the excellent impact on the processing properties of the composition caused by the silicon containing compound.

The use of the silicon containing compound according to the invention has therefore both an internal effect, e.g. a good mixing and dispersion in the polyolefin composition, and an external effect, i.e. it functions as processing aid between the extruder and the polymer melt. The external effect is the main issue.

In the preferred embodiment mentioned above, the silanol condensation catalysts of the polyolefin composition preferably is a Brönsted acid, i.e. is a substance which acts as a proton donor.

More particularly, the silicon containing compound, preferably, is compatible with the composition insofar as it, when having been present in the composition in an initial amount corresponding to 0.060 mole hydrolysable groups per 1000 g composition, after a storage at 60° C. for 74 h in air is still present in the composition at least in an amount corresponding to 0.035 mole hydrolysable groups per 1000 g composition. The Brönsted acids may comprise inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned.

Preferably, the Brönsted acid is a sulphonic acid, more preferably an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \quad \quad (II)$$

with Ar being an aryl group which may be substituted or non-substituted, and x being at least 1.

The organic aromatic sulphonic acid silanol condensation catalyst may comprise the structural unit according to formula (II) one or several times, e.g. two or three times. For example, two structural units according to formula (II) may be linked to each other via a bridging group such as an alkylene group.

Preferably, Ar is a aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in formula (II) x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

In a second preferred embodiment, the sulphonic acid catalyst is selected from those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and b) a compound selected from the group of
(i) an alkylated aryl disulfonic acid selected from the group consisting of the structure (III):

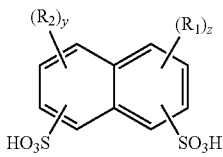

and the structure (IV):

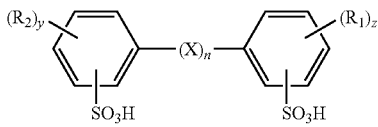

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —$C(R_3)(R_4)$—, wherein each of $R_3$ and $R_4$ is H or independently a linear or branched alkyl group of 1 to 4 carbons and n is 1; —$C(=O)$—, wherein n is 1; —S—, wherein n is 1 to 3 and —$S(O)_2$—, wherein n is 1; and (ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulphonic acids as described in the mentioned European Patents.

Preferably, in the polyolefin composition the silanol condensation catalyst is present in an amount of 0.0001 to 6 wt %, more preferably of 0.001 to 2 wt %, and most preferably 0.02 to 0.5 wt %.

Preferably, the cross-linkable polyolefin comprises, still more preferably consists of, a polyethylene containing hydrolysable silane groups.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

Preferably, the silane group containing polyolefin has been obtained by copolymerisation. In the case of polyolefins, preferably polyethylene, the copolymerisation is preferably carried out with an unsaturated silane compound represented by the formula $$R^1SiR^2{}_qY_{3-q} \qquad (V)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula $$CH_2=CHSi(OA)_3 \qquad (VI)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryl-oxypropyltrimethoxysilane, gamma (meth)acryloxypropyltriethoxysilane, and vinyl triacetoxysilane.

The copolymerisation of the olefin, e.g. ethylene, and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70 wt % of the copolymer, preferably about 0.5 to 35 wt %, most preferably about 1 to 30 wt %.

If using a graft polymer, this may have been produced e.g. by any of the two methods described in U.S. Pat. Nos. 3,646,155 and 4,117,195, respectively.

The silane-group containing polyolefin preferably contains 0.001 to 15 wt % of the silane compound, more preferably 0.01 to 5 wt %, most preferably 0.1 to 2 wt %.

Such a polyolefin composition when extruded together with the above described silicon containing compound as a processing aid exhibits almost thermoplastic behaviour. This means, inter alia, that the melt flow rate of the composition does not significantly drop upon extrusion even at comparatively high temperatures.

Therefore, preferably the polyolefin composition has a $MFR_{21}$ (190° C., 21.6 kg) of 50 g/10 min or more, more preferably 60 g/10 min or more, and most preferably 70 g/10 min or more when extruded at any temperature in the range of from 20 to 240° C.

Furthermore, it is preferred that the $MFR_{21}$ (190° C., 21.6 kg) of the composition when extruded at any temperature in the range of from 140 to 240° C. is 90% or more, more preferably 95% or more, of the $MFR_{21}$ (190° C., 21.6 kg) of the same composition extruded without silanol condensation catalyst.

The polymer composition may further contain various additives, such as miscible thermoplastics, antioxidants, further stabilizers, lubricants, fillers, colouring agents and foaming agents.

As antioxidant, preferably a compound, or a mixture of such compounds, is used which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO2005003199A1.

Preferably, the antioxidant is present in the composition in an amount of from 0.01 to 3 wt %, more preferably 0.05 to 2 wt %, and most preferably 0.08 to 1.5 wt %.

The silanol condensation catalyst usually is added to the silane-group containing polyolefin by compounding the polymer with a so-called master batch, in which the catalyst, and optionally further additives are contained in a polymer, e.g. polyolefin, matrix in concentrated form.

The silanol condensation catalyst and the silicon containing compound are preferably added to the silane group containing polyolefin by compounding a master batch, which contains the silanol condensation catalyst and the silicon containing compound in a polymer matrix in concentrated form, with the silane group containing polyolefin.

The matrix polymer is preferably a polyolefin, more preferably a polyethylene, which may be a homo- or copolymer of ethylene, e.g. low density polyethylene, or polyethylene-methyl-ethyl-butyl-acrylate copolymer containing 1 to 50 wt % of the acrylate, and mixtures thereof.

As stated, in the master batch the compounds to be added to the silane group containing polyolefin are contained in concentrated form, i.e. in a much higher amount than in the final composition.

The master batch preferably comprises the silanol condensation catalyst in an amount of from 0.3 to 6 wt %, more preferably from 0.7 to 3.5 wt %.

The silicon containing compound preferably is present in the master batch in an amount of from 1 to 20 wt %, more preferably from 2 to 10 wt %.

The master batch preferably is processed with the silane group containing polymer in an amount of from 1 to 10 wt %, more preferably from 2 to 8 wt %.

Compounding may be performed by any known compounding process, including extruding the final product with a screw extruder or a kneader.

The present invention furthermore relates to a process for compounding a polyolefin composition wherein the composition is compounded in the presence of a silicon containing compound according to any of the above described embodiments.

Preferably, the present invention relates to a process for producing an article comprising extrusion of a polyolefin composition in which the silicon containing compound is used according to any of the above described embodiments at a temperature in the range of 140 to 280° C., more preferably in the range of 160 to 240° C., and most preferably in the range of 180 to 200° C.

In a particularly preferred embodiment, the invention relates to the use of a silicon containing compound in any of the above described embodiments as a processing aid which reduces the retention time of a composition comprising a polyolefin comprising hydrolysable silane groups and a Brönsted acid as a silanol condensation catalyst in the extruder and/or reduces the extrusion temperature in the extrusion of said composition.

Finally, the invention also relates to the use of a silicon containing compound in any of the above described embodiments as a surface smoothening agent in a composition comprising a polyolefin comprising hydrolysable silane groups and a Brönsted acid as a silanol condensation catalyst.

The following examples serve to further illustrate the present invention.

EXAMPLES

1. Measurement Methods
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$) or 21.6 kg ($MFR_{21}$).

2. Compositions Produced
a) Master batches

Master batches were produced comprising:
   a matrix resin: an ethylene butylacrylate copolymer with 17 wt % butylacrylate, a density of 924 kg/m$^3$ and a $MFR_2$ of 7.0 g/10 min (OE6417 available from Borealis);
   a silanol condensation catalyst: linear dodecylbenzene sulphonic acid (DDBSA) has been used; or dibutyl tin dilaurate (DBTL) as a conventional silanol condensation catalyst;

a silicon containing compound: hexadecyl trimethoxy silane (HDTMS), an antioxidant: 4-methyl-phenol reaction products with dicyclopentadiene and isobutylene (Ralox LC, CAS-no. 68610-51-5).

The components were used in the master batches in the amounts as indicated in Table 1 (wt %). Compounding of the master batches was performed using a Brabender kneader (small chamber, 47 cm³), and 3 mm thick plates were compression moulded at 180° C.

TABLE 1

|  | Example 1 | Comparative Example 1 | Comparative Example 2 | Comparative Example 3 |
|---|---|---|---|---|
| Matrix | 88.5 | 92.5 | 90 | 87 |
| Sulphonic acid | 1.5 | 1.5 | — | — |
| DBTL | — | — | — | 3 |
| HDTMS | 4 | — | 4 | 4 |
| Antioxidant | 6 | 6 | 6 | 6 | b) Compositions

The master batches of Table 1 were processed in an amount of 5 wt % with 95 wt % of a silane group containing polyethylene having a density of 923 kg/m³, a $MFR_2$ of 0.9 g/10 min and a silane copolymer content of 1.3 wt % in a Brabender kneader followed by tape extrusion.

c) Retention Time

Retention time in the extruder was measured by adding a black coloured pellet into the inlet of the extruder during extruding the colourless compositions of Example 1 and Comparative Example 1. Then, the time period ($T_1$) between introduction of the black pellet at the extruder inlet and the appearance of black coloured polymer at the outlet of the extruder was measured, and the time period ($T_2$) between introduction of the black pellet at the extruder inlet and the total disappearance of black coloured polymer at the outlet of the extruder. The total retention time was then determined by the difference of $T_2$ and $T_1$. The results of the experiments are given in Table 2:

TABLE 2

|  | Example 1 | Comparative Example 1 |
|---|---|---|
| $T_1$ | 2 min 35 sec | 2 min 55 sec |
| $T_2$ | 3 min 55 sec | 5 min 30 sec |
| Retention time ($T_2 - T_1$) | 1 min 20 sec | 3 min 35 sec |

Example 1 according to the invention has a significantly shorter retention time in relation to Comparative Example 1.

d) Melt Flow Rate as Function of Temperature

The $MFR_{21}$ (190° C., 21.6 kg) of the compositions of Example 1 and Comparative Examples 2 and 3 was measured before extrusion. Then, on a 60 mm Troester cable extruder with a PE screw having a compression ratio of 1:3.6, the material was extruded onto floor at different temperature settings. For each temperature setting the melt temperature was measured and samples collected. Directly after extrusion the $MFR_{21}$ was measured. The results are given in Table 3.

TABLE 3

| Melt temperature/° C. | Before extrusion | After extrusion |||||| 
|---|---|---|---|---|---|---|---|
|  |  | 150 | 170 | 190 | 210 | 225 | 240 |
| Example 1 | 74 | 74 | 74 | 73 | 72 | 69 | 69 |
| Comparative Example 2 | 74 | 74 | 74 | 72 | 69 | 69 | 69 |
| Comparative Example 3 | 74 | 50 | 48 | 45 | 45 | 45 | 34 |

Example 1 is according to the invention. The comparison with Comparative Example 2 shows that the composition according to the invention behaves like a thermoplastic resin. Thus, no crosslinking occurs in the extruder, which can be seen in the constant $MFR_{21}$ level. Comparative Example 3 shows a composition which uses DBTL as a silanol condensation catalyst containing HDTMS demonstrating inferior behaviour as can be seen in the lowered $MFR_{21}$. Therefore, a combination of the right crosslinking catalyst and the processing aid according to the invention gives the best performance.

e) Tape Surface

The compositions of Example 1, and Comparative Examples 1, 2 and 3 were extruded in a Brabender tape extruder with a tape forming die having a melt temperature of 210° C. for 10 min. A 4:1 compression was used, and the heat was adjusted to 160° C., 180° C. and 210° C. for the different zones of the extruder. Water cooling was used on the feeding zone. The rotation speed was 30 rpm. Extrusion initially took place for 30 min.

To simulate time for tool changes, the extruder was stopped for the time indicated in Table 4. The extruder was then started again and after 30 min a tape sample for inspection was collected.

The tapes produced were visually inspected and the surface quality was rated according to the amount of gels counted, haziness and irregularities of the tape. In the rating, the numbers mean: 5 is good (the tape has no gels, perfect finish, no irregular shaped edges, thin and transparent look), 3 is acceptable to be used for commercial production (there are a number of small gels, the tape is somewhat hazy but still the edges of the tape is perfect), and below 3 is not acceptable for commercial use (there are significant amount of small gels and or some larger ones >1 mm).

The results are given in Table 4.

TABLE 4

| Extruder stop time (min) | 0 | 5 | 10 | 15 | 30 | 60 |
|---|---|---|---|---|---|---|
| Example 1 | 5 | 5 | 5 | 5 | 5 | 2 |
| Comparative Example 1 | 1 | 1 | 1 | 1 | 1 | 1 |
| Comparative Example 2 | 5 | 5 | 5 | 5 | 5 | 2 |
| Comparative Example 3 | 5 | 5 | 5 | 3 | 1 | 1 |

Example 1 is according to the invention and has excellent scorch tape rating after extrusion stops up to 30 minutes. Comparative Example 1 shows a non extricable composition since it is full of gels. Comparative Example 2 shows a thermoplastic behaviour which is similar to Example 1. Comparative Example 3 shows an inferior behaviour compared to the composition according to the invention. Therefore, a combination of the right crosslinking catalyst and the processing aid according to the invention gives the best performance.

The invention claimed is:

1. A process for reducing the retention time of a polyolefin composition comprising a crosslinkable polyolefin with hydrolysable silane groups in an extruder and/or reducing the extrusion temperature during the extrusion of the polyolefin composition, the process comprising:
   adding a master batch to the polyolefin composition to form a compounding composition; and
   compounding the compounding composition in the extruder;
   wherein the master batch comprises:
      a matrix polymer;
      a silanol condensation catalyst, wherein the silanol condensation catalyst is a Brönsted acid and is present in an amount of 0.7 to 3.5 wt % of the master batch; and
      a silicon containing compound in an amount of from 2 to 10 wt % of the master batch, having the structure of formula (I):

$$(R^1)_x[Si(R^2)_y(R^3)_z]_m \quad (I)$$

wherein
   $R^1$ is a linear or branched $C_6$- to $C_{22}$-alkyl group;
   $R^2$ is a linear or branched $C_1$- to $C_{10}$-alkoxy group;
   $R^3$ is —$R^4SiR^1_pR^2_q$, wherein p is 0 to 3, q is 0 to 3, with the proviso that p+q is 3; and
   $R^4$ is —$(CH_2)_r Y_s(CH_2)_t$— where r and t independently are 1 to 3, s is 0 or 1 and Y is a difunctional heteroatomic group selected from —O—, —S—, —SO—, —$SO_2$—, —NH—, —$NR^1$— or —$PR^1$—, where $R^1$ and $R^2$ are as previously defined; and
   x is 0 to 3, y is 1 to 4, z is 0 or 1, with the proviso that x+y+z=4;
   and m =1; and
   wherein the amount of the silicon containing compound is 0.01 to 1.5 wt % of the compounding composition.

2. The process of claim 1, wherein in the formula for the silicon containing compound:
   x=1, y=3, and, z=0.

3. The process of claim 1, wherein the silicon containing compound comprises hexadecyl trimethoxy silane.

4. The process of claim 1, wherein the crosslinkable polyolefin with hydrolysable silane groups comprises a polyethylene with hydrolysable silane groups.

5. The process of claim 4, wherein in the crosslinkable polyolefin with hydrolysable silane groups the silane groups are present in an amount of 0.001 to 15 wt %.

6. The process of claim 1, wherein the silanol condensation catalyst comprises an organic sulphonic acid.

7. The process of claim 6, wherein the organic sulphonic acid comprising 10 C-atoms or more, the sulphonic acid further comprising at least one aromatic group.

8. The process of claim 6, wherein the organic sulphonic acid comprises the structural element:

$$Ar(SO_3H)_x \quad (II)$$

with Ar being an aryl group which may be substituted or non-substituted, and x being at least 1.

9. The process of claim 8, wherein in formula (II) Ar is substituted with at least one $C_4$- to $C_{30}$-hydrocarbyl group and the silanol condensation catalyst comprises from 10 to 200 C-atoms.

10. The process of claim 1, wherein the polyolefin composition has an $MFR_{21}$ (190° C., 21.6 kg) of 50 g/10 min or more when extruded at any temperature in the range of from 20 to 240° C.

11. The process of claim 1, wherein the amount of the silicon containing compound is 0.2 wt % to 0.5 wt % of the compounding composition;
   wherein the silicon containing compound is hexadecyl trimethoxy silane; and wherein the silanol condensation catalyst is dodecylbenzene sulfonic acid.

* * * * *